Dec. 30. 1924.
C. F. JENKINS
PHOTOGRAPHING OSCILLATING SPARKS
Filed Aug. 30, 1922
1,521,188
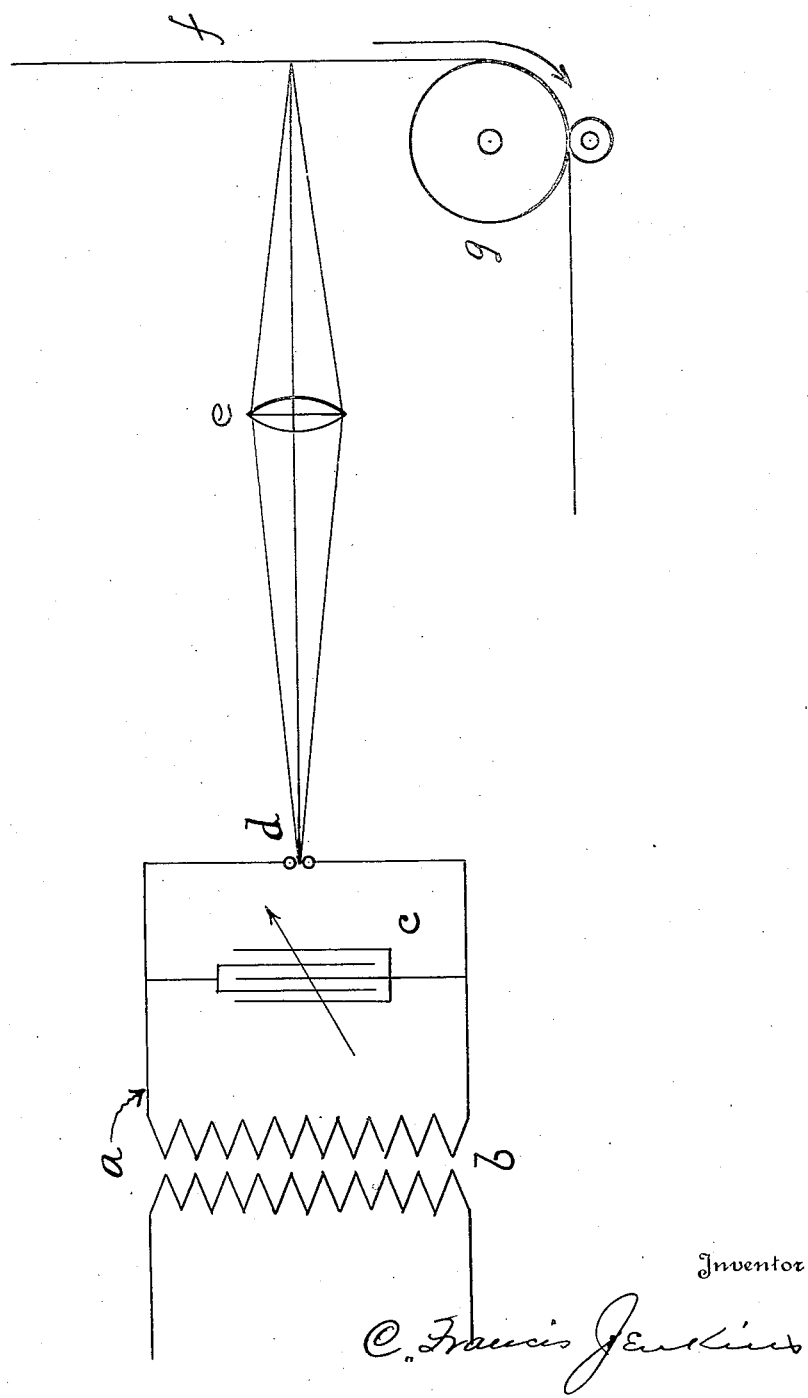
Inventor
C. Francis Jenkins Patented Dec. 30, 1924.

1,521,188

UNITED STATES PATENT OFFICE.

CHARLES FRANCIS JENKINS, OF WASHINGTON, DISTRICT OF COLUMBIA, ASSIGNOR TO RADIO PICTURES CORPORATION, OF WASHINGTON, DISTRICT OF COLUMBIA, A CORPORATION.

PHOTOGRAPHING OSCILLATING SPARKS.

Application filed August 30, 1922. Serial No. 585,317.

*To all whom it may concern:*

Be it known that I, CHARLES FRANCIS JENKINS, a citizen of the United States, residing at Washington, District of Columbia, have invented certain new and useful Improvements in Photographing Oscillating Sparks, of which the following is a specification.

This invention relates to apparatus for broadcasting of photographs and motion-pictures-by-radio, and has for its object means for imaging a succession of sparks on a photographic plate, the rate of the oscillation of the sparks varying to correspond to the electrical strength of the current causing the sparks.

In the diagrammatic drawing herewith, $a$ is an oscillating circuit made up of inductively coupled coils $b$; a condenser $c$; and a spark gap $d$. E is a lens for imaging the sparks of the spark gap onto the light-sensitive film $f$, drawn forward by the drum $g$.

Assuming the circuit to be adjusted to the minimum incoming current, the sparks will then occur relatively infrequently and therefore the accumulated actinic effect on the photographic film is inappreciable. But when the current is increased the sparks occur with increasing frequency and therefore the cumulative effect on the film is increased and a developable exposure is obtained.

The photographic plate $f$ is effected directly as the number of sparks passing the gap $d$ in a given time. As the film is moving forward at a uniform rate it is evident that the more frequent the sparks the greater the density of the area in the developed negative will be, and the less the number of sparks the less the density. Therefore, the density of the different parts of the negative depends directly on the current fluctuations.

What I claim is—

1. An oscillating electrical circuit, a spark gap therein, a light sensitive surface, and means for exposing sparks crossing said gap upon a light sensitive surface whereby fluctuations in the current strength varies the number of sparks passing the gap in unit time.

2. An oscillating electrical circuit, a spark gap therein, a photographic surface to be actinically affected thereby, and optical means for focusing said gap upon said photographic surface whereby fluctuations in the current strength varies the number of sparks passing the gap in unit time.

3. An oscillating electrical circuit, a spark gap therein, and means whereby fluctuations in the current strength of said circuit varies the number of sparks passing the gap in unit time.

4. An oscillating electrical circuit, a spark gap therein, means whereby fluctuations in the current strength of said circuit varies the number of sparks passing the gap in unit time, and a photographic surface to be actinically affected thereby.

5. In apparatus of the class described, a light sensitive surface, a spark gap so located that sparks crossing the gap are recorded on the light sensitive surface, and means for controlling the number of sparks crossing the gap in unit time.

In testimony whereof I have affixed my signature.

CHARLES FRANCIS JENKINS.